(12) United States Patent
Neumann et al.

(10) Patent No.: US 8,445,806 B2
(45) Date of Patent: May 21, 2013

(54) DRIVE DEVICE FOR EROSION TOOLS

(75) Inventors: Frank Neumann, Langen (DE); Egbert Linnebach, Brachttal (DE); Stefan Kunz, Bingen (DE)

(73) Assignee: Institut fur Mikrotechnik Mainz GmbH, Mainz (DE)

( * ) Notice: Subject to any disclaimer, the term of this patent is extended or adjusted under 35 U.S.C. 154(b) by 439 days.

(21) Appl. No.: 12/734,507

(22) PCT Filed: Nov. 6, 2008

(86) PCT No.: PCT/EP2008/065062
§ 371 (c)(1),
(2), (4) Date: May 6, 2010

(87) PCT Pub. No.: WO2009/060031
PCT Pub. Date: May 14, 2009

(65) Prior Publication Data
US 2010/0320172 A1    Dec. 23, 2010

(30) Foreign Application Priority Data
Nov. 8, 2007   (DE) .................. 10 2007 054 308

(51) Int. Cl.
*B23H 7/00* (2006.01)
(52) U.S. Cl.
USPC ........................................ 219/69.12
(58) Field of Classification Search
None
See application file for complete search history.

(56) References Cited

U.S. PATENT DOCUMENTS

| | | | |
|---|---|---|---|
| 3,758,739 A | 9/1973 | De Jongh et al. | |
| 4,136,915 A | 1/1979 | Derner | |
| 4,347,422 A | 8/1982 | Schneider | |
| 4,393,292 A | 7/1983 | Inoue | |
| 6,788,019 B2* | 9/2004 | Imai et al. | 318/570 |
| 6,881,918 B2* | 4/2005 | Miyake et al. | 219/69.2 |
| 7,518,081 B2* | 4/2009 | Miyake et al. | 219/69.2 |
| 2003/0080094 A1* | 5/2003 | Imai et al. | 219/69.11 |
| 2005/0016965 A1* | 1/2005 | Miyake et al. | 219/69.2 |
| 2007/0102402 A1* | 5/2007 | Miyake et al. | 219/69.15 |
| 2008/0197115 A1* | 8/2008 | Miyake et al. | 219/69.11 |
| 2010/0320172 A1* | 12/2010 | Neumann et al. | 219/69.13 |

FOREIGN PATENT DOCUMENTS

| | | | |
|---|---|---|---|
| CH | 350735 A | | 1/1961 |
| DE | 1 237 713 | | 3/1967 |
| DE | 28 11 274 A1 | | 9/1979 |
| DE | 2911721 A | * | 11/1979 |
| DE | 30 32 604 A1 | | 3/1981 |
| EP | 0 264 147 A2 | | 4/1988 |
| EP | 0 636 443 A1 | | 2/1995 |
| EP | 0 707 916 A1 | | 4/1996 |
| EP | 1 473 103 A1 | | 11/2004 |
| EP | 1 721 693 A1 | | 11/2006 |
| FR | 2 577 156 A1 | | 8/1986 |
| JP | 60-255323 A | | 12/1985 |
| JP | 01234162 A | * | 9/1989 |
| JP | 30-60928 A | | 3/1991 |
| JP | 6055347 A2 | * | 3/1994 |
| JP | 2000192958 A | * | 7/2000 |
| JP | 200218442 A2 | * | 8/2000 |
| WO | WO 2006/092838 A1 | | 9/2006 |

* cited by examiner

*Primary Examiner* — David E Graybill
(74) *Attorney, Agent, or Firm* — Hudak, Shunk & Farine Co. LPA

(57) ABSTRACT

A drive device for erosion tools, having a drive shaft, an electrode holder connected to the drive shaft, an axial drive which works on the drive shaft, a rotational drive which works on the drive shaft as a direct drive in a contactless manner, and a radial bearing. The radial bearing is constructed as a ball track.

20 Claims, 4 Drawing Sheets

DRIVE DEVICE FOR EROSION TOOLS

FIELD OF THE INVENTION

The invention relates to a drive device for eroding tools, particularly for ECM and EDM machining, more specifically for micromachining such as boring of microbores. The drive device has a drive shaft, an electrode holder connected to the drive shaft, an axial drive which acts on the drive shaft, a rotational drive which acts on the drive shaft as a direct drive without contact, and a radial bearing.

BACKGROUND OF THE INVENTION

In the area of technology of electroerosive machining, particularly for very small structures (micro-spark erosion), there is the acute problem that high aspect ratios are needed. This means that the required ratio of the structural depth to the (smallest) lateral strain is often very high (10 or more). As the depth of the erosion increases there is the problem that, as a result of decreasing dielectric circulation in the base of the bore, eroded particles tend to accumulate which then impede a defined spark arc-over. This causes a slowing of the boring process and increased wear on the electrode, as well as degradation of the structural precision of the bore. The literature discloses a number of approaches to mitigate these effects.

E.g., DE 3032604 proposes the use of hollow tubular electrodes for production of bores, wherewith the dielectric is fed to the base of the bore under pressure through the interior of the electrode. This method is of limited effect with bores of very small diameter. For an electrode internal diameter of less than 70 microns, the pressure drop over the length if the electrode is so high that practically no more dielectric can be forced through it. Pressurized rinsing is thus not an option in this situation.

In DE 3032604 it is proposed to support pressurized rinsing by means of vibrational excitation of the electrode at high or low frequency. Vibration of the electrode can assist the process because the dielectric is caused to move in the working gap and thus holds the erosion particles in suspension. In order to produce very small structures (as small as less than 10 micron) with maximum possible accuracy, very high requirements are placed on the drive device. This technique has promise but awaits further means of improvement.

It is known from FR 2577156 to transmit a vibrational movement in the advancing direction of the electrode with a rotational movement of the electrode along its longitudinal axis. The reported effects of this represent another improvement. However, the drive device disclosed in that patent document is insufficiently precise, particularly as to its vibrational drive and guide unit, to succeed in producing structures of very small dimensions. The connection to an external rotational drive is furnished by a cone on the upper side of the device. The axially acting linear drive operates via a plunger coil, wherewith the drive shaft has a coupling in the form of spring elements, in order to transmit the rotational movement and to provide a degree of freedom for the axial oscillation. The rigid part of the drive shaft is supported by grooved ball bearings, and the axially movable part of the drive shaft is radially supported against a housing by means of a sliding bearing.

Because the present device is intended to be suitable for micromachining in particular, high requirements are placed on the accuracy of its concentric alignment. Rotational tolerances in the submicron range are not achievable with the device according to FR 2577156 because of imprecision of the guiding- and drive components.

JP 3060928 and JP 60255323 disclose drive devices for erosion tools, having a plurality of piezo actors by means of which an electrode holder with its electrode can be displaced in all three spatial dimensions, and in particular in the case of JP 60255323 can be tipped so as to deviate the orientation of the longitudinal axis. The tipping serves to correct possible deviation of the electrode with respect to the direction of advance. JP 3060928 proposes to employ the piezo drive to support the process, in particular to move the electrode back and forth in the direction of advance. Nothing is said concerning the precision of the structure, particularly the precision of the guide unit, for purposes of achieving high precision in the machining.

EP 0636443 has the objective of improving erosion conditions by causing high frequency microvibrations to act on the electrode holder, the amplitudes of the vibrations being smaller than the spark gap at the base of the bore. Preferably, piezo actors are utilized for this effect; they act upon an elastic metal block. The system is designed for operation in a resonant state. For this reason, and by reason of the principle of the guide means disclosed in the document, there is no assurance that the electrode will move parallelly to the longitudinal axis.

DE 2811274 A1 discloses a device for controlling the electrode of a spark erosion machine having adjustable eccentricity of the electrode holder. The electrode holder is connected to a shaft which on its outer periphery is mounted in the housing of the device, via a bushing and a ball bushing.

DE 1237713 B discloses a drive device for an erosion electrode wherein a drive rod is moved back and forth in the axial direction by a leading spindle, and is simultaneously rotated around the longitudinal axis by engagement in a spiral path in a cam tube (with guide means for a cam). The drive rod is mounted in a frame by means of two ball bushings which enable the superposed axial and rotational movement.

CH 350735 A relates to a holding and drive device for erosion tools which is rotatable around an axis and is slideably displaceable in the axial direction. The guiding in the axial direction is by means of two parallel guide tubes each of which has an interior tube, wherewith a ball bearing with race is disposed between the respective guide tube and inner tube, for practically play-free and frictionless mounting of the interior tube. The two interior tubes are rigidly interconnected via a connecting arm. One interior tube has a drive shaft for the electrode holding device, which shaft is movable therein via a needle bearing and two ball bearings which absorb axial as well as radial forces.

EP 0264147 also discloses devices for fine adjustment by means of piezo actors. These are incorporated in elastic monolithic blocks which allow movements in multiple dimensions. The use and conversion of such adjusting drives as drive devices for erosion tools is not discussed in any appreciable detail. Such systems do allow exact axial guiding [and positioning]. However, they are costly to produce and impracticable to produce on any useful scale.

Another drive and bearing concept is disclosed in EP 1473103 A1. All of the bearings and positioning drives employ electromagnetic means. According to an exemplary embodiment, two electromagnetic positioning drives disposed an axial distance apart are provided for radial (x-y) spindle displacement. Further, there are two axially acting positioning drives (z-displacement) for the spindle, and these can be used also to produce axial vibration. Also, an electromagnetic rotational drive is provided which acts directly on the spindle. Finally, there are two mutually axially separated electromagnetic auxiliary bearings which limit the excursion of the radial spindle displacement. The described drive device is the first that combines the initially described features.

The known drive concepts are beset with certain problems, as a result of the contactless electromagnetic actors; this is particularly true of drive devices with externally coupled rotational drive means through which, as a rule, undesirable transverse forces are conducted into the drive device. The disclosed bearing principle for the spindle allows radial vibration modes to form in the spindle, and these are disadvantageous as to the necessary precision.

SUMMARY OF THE INVENTION

An underlying problem of the invention was to devise a drive device for erosion tools which, in order to achieve good rinsing of the bore gap and thereby a high quality of bore formation even at high aspect ratios, combine (superpose) a rotational movement and an axial movement. A further underlying problem was, for such a device, to provide means whereby all movements are executed with high precision, in order to enable use of the device for micromachining. Finally, an underlying problem of the invention was to devise a drive device of the described (inventive) type which is inexpensive to manufacture.

These problems are solved with a drive device having the features set forth in the claims.

According to the invention, the radial bearing in a drive device of the described type is in the form of a ball track.

Radial bearings according to the state of the art are in the form of grooved ball bearings which do not have an axial degree of freedom and therefore the superposed axial and radial movements must be decoupled, in a manner which adds materially to manufacturing costs. In contrast, the ball track according to the invention allows simultaneous axial movement (translation) and rotational movement (rotation), of the shaft supported by the bearings. The drive shaft can be configured without coupling means and therefore in a single piece. The advantages of a direct drive, which also allows a single-piece throughgoing drive-free shaft which does not require an inherent bearing in contrast to a shaft with an attached motor, can only be exploited fully if the direct drive is combined with the inventively employed ball track, because only with this arrangement is the number of radial bearings reduced to a single bearing.

Despite the increased degrees of freedom, the inventive application of a highly precise ball track in a drive device of the general type described hereinabove also provides, surprisingly, a higher precision of the linear and rotational movement than the customarily used grooved ball bearings and than magnetic bearings. The reason for this is the inventive configuration of the ball track, which has a race with a plurality of rows of balls, preferably arranged whereby the balls in successive rows are displaced in the circumferential direction. The term "row of balls" is understood to mean any sequence of balls in a plane perpendicular to the shaft axis. The balls in a given row are preferably evenly (symmetrically) angularly separated. The displacement in the circumferential direction can be achieved, e.g., by rotation of two neighboring rows of balls containing the same number of balls spaced at the same angular spacing; this leads to a high density of the balls and thereby the optimum closeness of the balls in an areal ball track; alternatively the circumferential displacement can be achieved by having different numbers of balls in different rows.

According to an embodiment of the inventive drive device, the radial bearing is configured such that, for each ball in the race, another ball is disposed on the radially opposite side of the drive shaft. This requires an even number of balls in each axial plane in which a row of balls is present. In this way, the shaft is always symmetrically supported on both sides, thereby improving the play. Alternatively, or supplementarily, rows of balls may be supplied which have an odd number of balls which are regularly distributed around the circumference of the shaft. E.g., 3 balls may be disposed symmetrically in an axial plane, i.e. transverse plane, with a distribution of 120°. In particular, rows of balls with an odd number of balls can be alternated with rows with an even number of balls.

The plurality of rows of spheres with circumferential displacement (as described) provides numerous support loci for the shaft over an extended axial segment, and thus the bearing much more closely acts like an areal bearing than do grooved ball bearings or known magnetic bearings having two axially separated shaft supports having point or line configuration, wherewith magnetic bearings one cannot avoid flexure of the shaft between the bearings. This defect of magnetic bearings can lead to undesirable wobbling movements and generally to excessive concentricity tolerances, particularly if the shaft is excited at its resonance frequency as a result of imperfect "interfering" drive forces.

Another advantage of the inventive employment of a ball track lies in that, in contrast to the employment of two axially separated grooved ball bearings, only one bearing bore is required. This results in technically easier and less costly fabrication compared to two axially separated bores, which must be precisely coaxially aligned.

According to a particularly compact structure, the balls outerly rest against the inner periphery of a bearing bore in a housing of the drive device, and innerly they rest directly against the drive shaft. The radial space requirement for the ball track is then not greater than the diameter of the balls. This structure places strict requirements on the precision of the machining of the bearing bore and the shaft. This precision involves the surface quality as well as the precision of the dimensions of the bearing elements. Such high precision allows the ball track to be preferably pre-stressed, so as to provide sufficient freedom of play and sufficiently ready accessibility.

According to a preferred embodiment, the ball track comprises a bushing wherewith the balls rest against the inner periphery of the bushing.

The bushing may be in simple fashion inserted into an accommodating bore in a housing of the drive device. The necessary high guiding precision, for the translational as well as the rotational movements, is achieved by high precision of machining of the interior peripheral running surfaces of the bushing, and by the use of balls, preferably steel balls, which are of high quality and have high dimensional precision. The bushing may also be hardened, to provide improved long term stress capability without deformation.

In this embodiment, it is particularly preferred for the spheres to rest against the outer periphery of the drive shaft.

In this connection it is necessary that the roundness and cylindricity of the running surface on the shaft be of high precision. The inventive form of the radial bearing is much more compact than the known employed grooved ball bearings having inner and outer rings, because according to the preferred embodiment there is no inner ring, and the outer rings can be functionally replaced by the bushing, which can also be produced in a linear shape, despite imperfect profiling.

Advantageously, the ball race is comprised of plastic material.

Such races are known, e.g. from U.S. Pat. No. 4,136,915 A. The use of plastic minimizes the friction between the moving parts, and also minimizes wear, allowing the high precision to be maintained over a long time.

As the direct drive, preferably a synchronous motor is employed, with the drive shaft being preferably rendered constantly magnetized, i.e. supplied with the necessary magnetic field by permanent magnets. Particularly preferably, the direct drive is in the form of a torque motor.

In this way, with this motor drive, torque is transmitted without contact and thereby free of transverse forces and friction; moreover the tendency toward vibration and wobbling are also reduced.

The rotational drive is preferably configured for a rotational speed of 0-3000 revolutions per minute, particularly preferably 500-1500 rpm.

The axial drive is preferably ring-shaped, and the drive shaft is preferably in a surrounding configuration.

Because of the free inner path, a rotationally symmetric configuration is possible, wherewith the forces of the axial drive do not exert any tilting moment on the drive shaft. In this way, the precision of the shaft movement is optimized, and concentricity tolerances of 1 micron or less are achieved, such as are necessary for erosive machining of very fine structures.

Regarding a compact structure, it is further been found advantageous if the axial drive and the ball track are disposed such that the axial drive surrounds the ball track, in at least one axial segment.

The radially compact structure of the ball track enables a drive device which is also compact in the axial direction. The compactness increases the application possibilities. E.g., such an inventive drive device is suitable for use as a flexible auxiliary apparatus in flexing arm robots, in order to, e.g., produce microbores in large components such as turbine blades, aircraft engines, or the like. Such an application has long been unknown and deemed impossible. In particular, shortening of the drive shaft results desirably in increased resonance frequency and a decreased vibration amplitude, which improves the precision of concentricity and the freedom from wobbling.

The axial drive is preferably a piezo drive. Particularly preferably, it comprises a ring piezo actor or three "stacked actors" disposed symmetrically around the drive shaft.

The latter structure is less costly. "Stacked actors" have the basic advantage that large excursions can be achieved with low control voltage.

Preferably, the three "stacked actors" are interconnected in a zero-play and frictionless manner via solid linking bodies.

The solid linking bodies allow only one degree of freedom, namely in the axial direction, wherewith force components transverse to the longitudinal axis of the device which act on the shaft are largely excluded, ensuring a high precision.

According to an advantageous refinement of the inventive drive device, the axial drive, particularly the piezo drive, is pre-stressed in a simple manner. For this purpose, a spring-loaded disc is disposed between the axial drive and a housing segment of the drive device, under stress.

Overall, the axial drive is preferably designed for a vibration frequency of 0-500 Hz, particularly preferably 100-400 Hz, and for a vibration amplitude of 1-15 micron, particularly preferably 2-10 micron. In this way, the vibrational drive is preferably able to apply axial forces of 0-1000 N, particularly preferably 50-600 N, most preferably 150-500 N.

According to an advantageous refinement, the drive shaft is in the form of a hollow shaft.

In this way, one has a throughgoing opening for passage of a dielectric, wherewith in combination with a tubular hollow electrode, means are provided to assist the rinsing of the bore, where needed.

BRIEF DESCRIPTION OF THE DRAWINGS

Additional features and advantages of the invention will be described in more detail hereinbelow, with reference to an exemplary embodiment, and with the aid of the accompanying drawings.

DETAILED DESCRIPTION OF THE INVENTION

Figure 1:
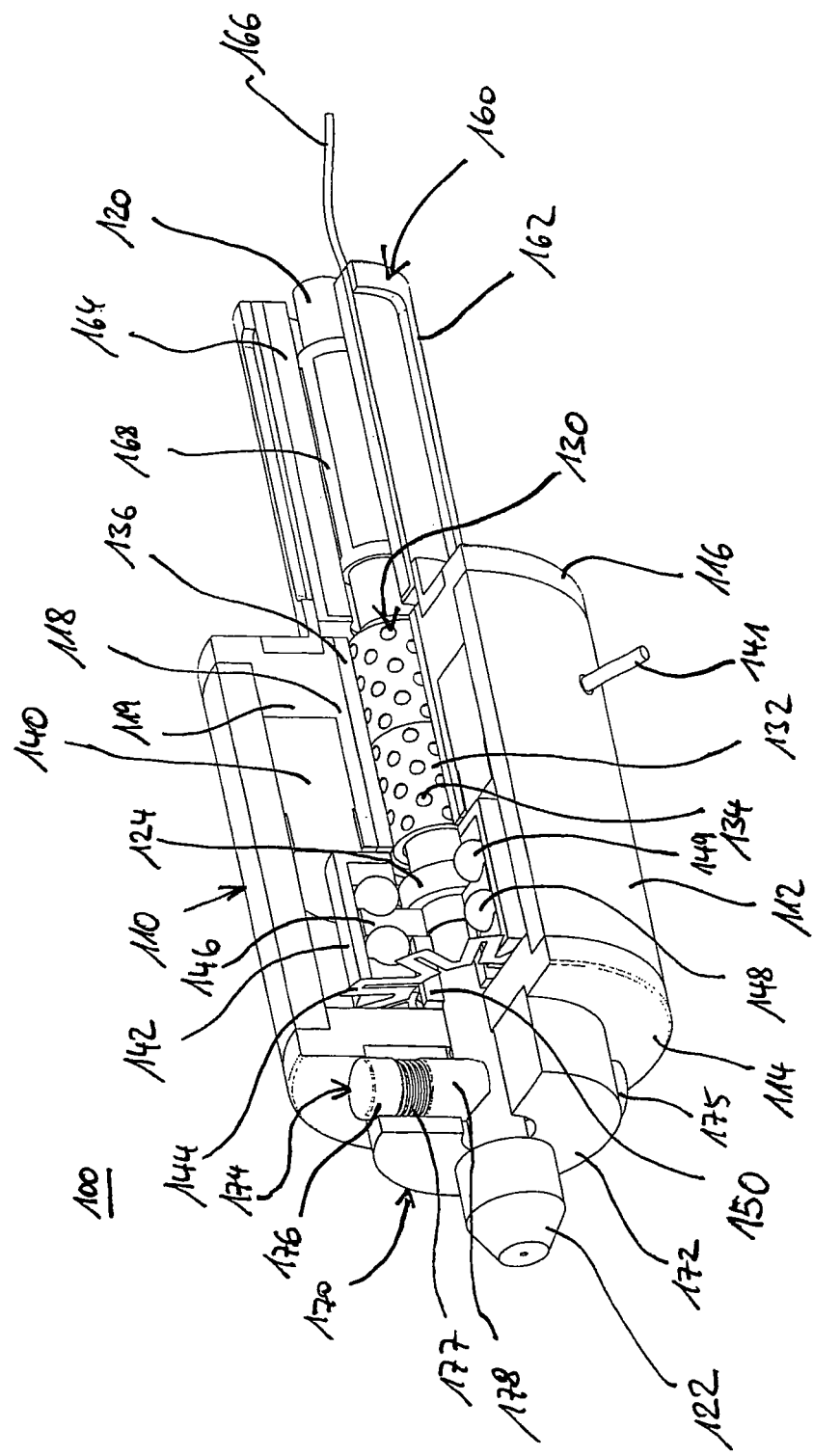
FIG. 1 is a three dimensional perspective view of a first exemplary embodiment of the inventive drive device.
Figure 2:
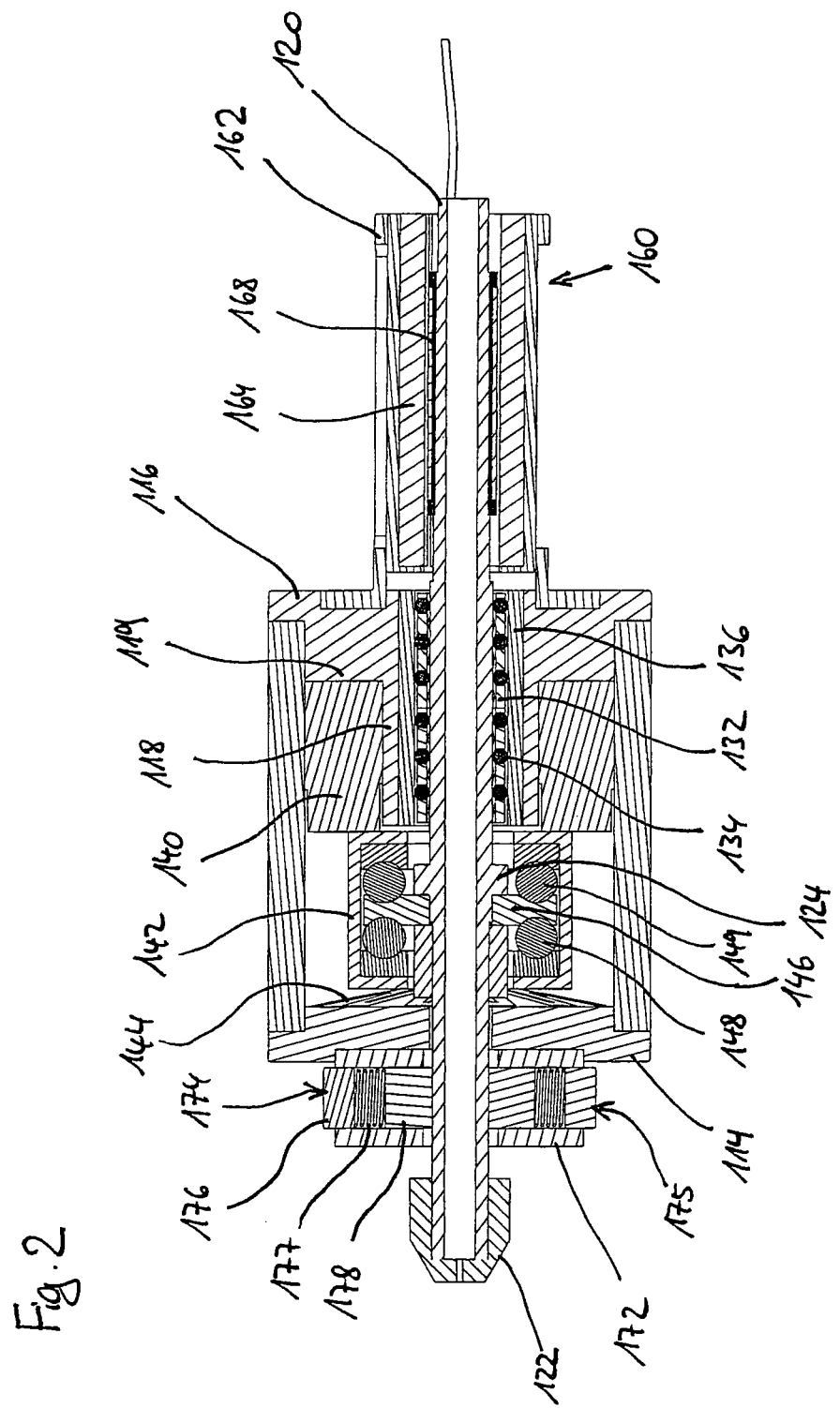
FIG. 2 is a cross sectional view of the drive device according to FIG. 1.

The drive device 100 illustrated in FIGS. 1 and 2 has a housing 110 with a cylindrical housing shell 112 and two housing covers (114, 116) at respective ends of the housing. A drive shaft 120 is coaxially mounted in the housing 110; shaft 120 exits the housing 110 through the end-disposed housing covers (114, 116). The drive shaft has on one end an electrode accommodating or holding structure 122 in which the eroding electrode (not shown) can be held by compressive force.

At approximately the axial middle of the shaft, the shaft is radially supported by a ball track 130. The ball track 130 is comprised of a ball race 132 in which a plurality of rows of balls 134 are disposed which rows are distributed around the circumference, said balls being constrained from departing from the race but being allowed to move e.g. rotate relatively freely. The ball race is preferably comprised of plastic so that the balls are retained frictionlessly in the race. The ball track 130 further is comprised of a cylindrical bushing 136 in which the ball race 132 with the balls 134 is rotatably mounted, wherewith the balls rest against the inner periphery of the bushing 136 and roll there. The bushing 136 is disposed in a bearing enclosure section 118 of the housing cover 116, and is fixed there by, e.g., compressive fitting.

The other side of the balls 134 rests directly against the outer periphery of the drive shaft 120. Preferably they roll under pre-stressing, forcibly engaged between the shaft 120 and the bushing 136, and thereby they enable movement under high precision in the axial direction as well as in the rotational direction. With appropriate adjustment of the pre-stressing, sufficient play and easy movement are provided for as well as a high degree of control. The required precision for establishing the pre-stressing is achieved by high accuracy of shape and mass of the balls 134 as well as of the running surfaces on the shaft 120 and in the bushing 136. By very fine finishing of the running surfaces, friction is reduced and thereby a course of movement which is facile and smooth free of jerkiness is provided. Because the matching of the shaft 120, balls 134, race 132, and bushing 136 promotes the necessary bearing properties, the requirements for precision as to the bearing enclosure section 118 are not so strict, resulting in reduced manufacturing cost for the housing 110.

Because of the substantial axial extent of the bearing, a plurality of bearing rows in a plane perpendicular to the shaft axis can be disposed one behind the other. In this way, a large number of support points are produced in the axial direction. Neighboring [circular] bearing rows are also mutually displaced in the circumferential direction, wherewith in the exemplary embodiment according to FIG. 1 each circular bearing row has the same number of balls, and neighboring rows are displaced by a "half division", i.e. by half the angle represented by the distance between two neighboring balls in a given circular bearing row. This provides the maximum density of balls, ensuring the most uniform possible radial distribution of force and thereby a high capability of the bearing to support a load as well as a high robustness in the guiding of the shaft, while still having a relatively compact bearing. In particular, high robustness in the guiding of the shaft and minimization of net transverse forces are achieved by the fact that for each ball 134 in the race 132 there is another exactly opposite ball.

The housing cover 116 also has an accommodating section 119 for an axial drive 140. The axial drive has the shape of a ring which coaxially surrounds the drive shaft 120. It is also disposed in the same axial segment as the ball track 130 and it surrounds the ball track in at least part of the ball track's axial extent. In this way, one can have a very compact, i.e. short structure for the drive device 100. The axial drive 140 is schematically represented as a ring element. It is preferably a piezo drive and may be in the form of a single ring-shaped piezo actor or a plurality of piezo actors, preferably three such, arrayed symmetrically around the drive shaft 120. To ensure that the three piezo actors do not generate any torsional moment with respect to the direction of the longitudinal axis in an axial plane, they must be symmetrically disposed at exactly 120° intervals. For the same reason, preferably the stacked piezo actors should be interconnected without play or friction, by means of solid link members (not shown).

The axial drive 140 is forcibly engaged against the housing cover 114 by means of an axial ball bearing 142 and a disc spring 144, and is forcibly engaged against housing cover 116 directly at the accommodation section 119. By an appropriate selection of the disc spring 144 (or an analogous axially acting spring-loaded element) and an appropriate selection of a distance between the two housing covers (114, 116), e.g. by means of a fine threading in the housing 110, a necessary pre-stressing can be applied to the axial drive.

In order to minimize transverse forces acting radially on the shaft via the axial ball bearing 142, the bearing is in the form of a purely axial bearing. In the illustrated embodiment according to FIGS. 1 and 2, the axial ball bearing 142 has an axial support ring 146 which is rotatably disposed between two parallel [circular] rows of balls (148, 149) disposed at an axial distance apart. The axial support ring 146 lies against a radially projecting collar 124 on the drive shaft 120 and against a pressure ring 150 (e.g. in the form of a short sleeve) which is axially displaceable on the drive shaft 120, so as to be engaged by those two elements. There is no radial engagement between the rotatable drive shaft 120 and any fixed component, because the supporting ring 146 is free in the radial direction.

The forcible engagement of the movement of the axial drive 140 occurs via the axial ball bearing 142, particularly via the axial support ring 146 on the one hand and the thrust ring 150 on the shaft 120. The rearward force is transmitted without play from the spring disc 144, [and] the axial ball bearing 142 (particularly the axial support ring 146), to the collar 124 of the shaft 120. Strictly speaking, the spring disc 144, even though it is a passive component, is an active part of the axial drive.

Coaxially to the drive shaft 120 and the housing 110, a rotational drive 160 is disposed on one side of the housing. This drive 160 is mounted via a motor housing 162 to the housing cover 116 of the drive device 100. In the interior of the motor housing 162, the stator 164 is disposed; it has windings through which current flows; the motor is preferably a synchronous motor. The windings are connected via a line 166 to a suitable source of [electrical] drive energy. In the axial segment of the drive shaft 120 which passes through the motor housing 162, the rotor 168 is connected to the drive shaft 120. Preferably, the rotor is comprised of means of magnetization of the drive shaft by permanent magnets fixed to the drive shaft. With this principle of operation, the drive energy is supplied without contact and thereby without application of transverse forces to the drive shaft 120. Accordingly, the mass of the drive shaft is increased only by the permanent magnets, which is beneficial with regard to the resonance frequency and the forces needed to produce axial vibration. Also beneficial with regard to the resonance frequency is the compact construction, which allows the axial drive 140 and the rotational drive 160 to be disposed close to the ball track 130. This enables achievement of high configurational precision concentricity etc.

On the side of the housing 110 opposite to the rotational drive 160 there is the current feed for erosion 170. This is comprised of a connecting housing 172 in which there are disposed connecting elements (174, 175) which are oriented radially with respect to the drive shaft 120. Each of the connecting elements (174, 175) has an adjusting screw 176 connected to the connecting housing 172, a pressure spring 177 which abuts against the adjusting screw 176, and a sliding contact 178 which is pressed against the drive shaft 120 by means of the pressure spring 177. Because of the symmetric arrangement of the two connecting elements (174, 175), the respective pressures can be adjusted such that the net radial force on the drive shaft is zero, and the configurational precision of the shaft is unaffected.

Figure 3:
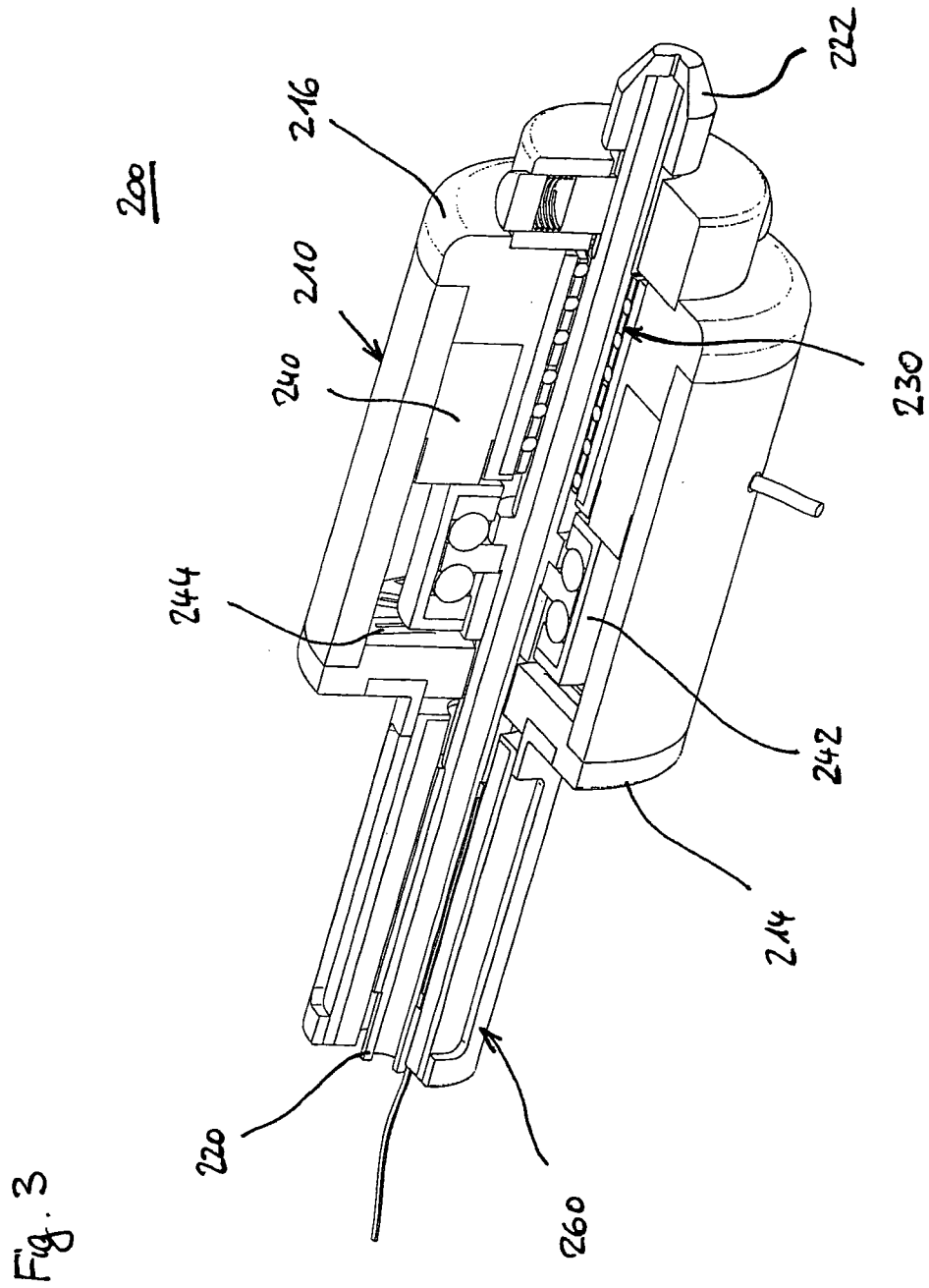
FIG. 3 is a three dimensional perspective view of a second exemplary embodiment of the inventive drive device.
Figure 4:
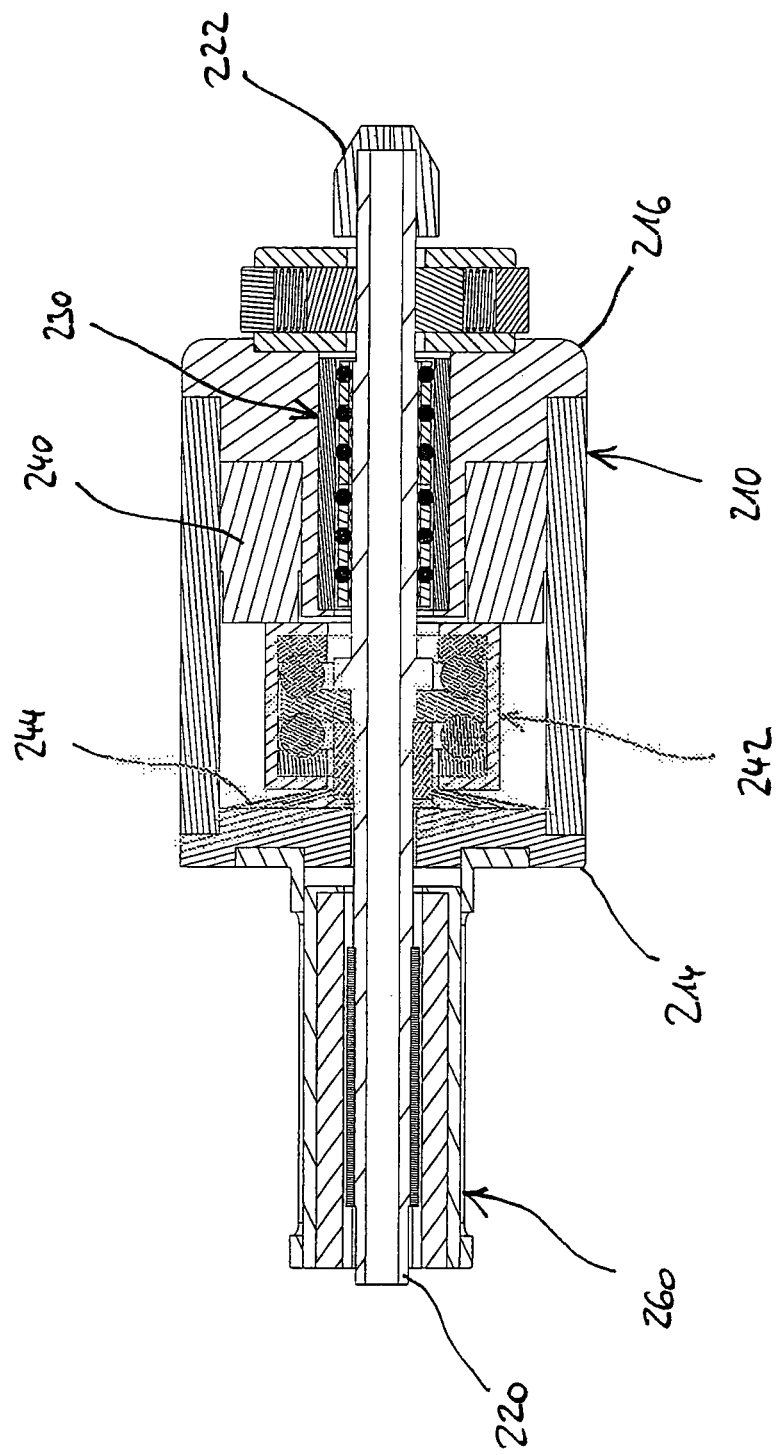
FIG. 4 is a cross sectional view of the drive device according to FIG. 3.

The embodiment of the inventive drive device illustrated in FIGS. 3 and 4 differs from that according to FIGS. 1 and 2 in that the inner housing structural components comprising the ball track 230, the axial drive 240, the axial bearing 242, the spring disc 244, and the two housing covers (214, 216) are arranged in the opposite sequence with respect to the longitudinal axis. Accordingly, the radial support of the drive shaft 220 is closer to the electrode holder 222, wherewith the free end of the drive shaft 220 on the side of the electrode is shorter, and therefore the supporting effect at this end is more robust. On the other hand, the free end of the drive shaft 220 at which the rotational drive 260 is disposed is longer. Accordingly, with this arrangement it is even more important to avoid exertion of any transverse forces on the drive shaft 220 having origins in the rotational drive 260, in order to ensure proper idling alignment of the over drive device 200. All of the other components of the drive device 200 correspond to those of the first exemplary embodiment according to FIGS. 1 and 2.

LIST OF REFERENCE NUMERALS

100 Drive device
110 Housing
112 Housing shell
114 Housing cover
116 Housing cover
118 Bearing accommodation section
119 Accommodation section for the axial drive
120 Drive shaft
122 Electrode accommodating or holding structure
124 Collar
130 Ball track
132 Race for ball track
134 Balls
136 Bushing
140 Axial drive
141 Conductors
142 Axial (ball) bearing 144 Spring-loaded disc
146 Axial support ring
148 Row of balls
149 Row of balls
150 Pressure ring
160 Rotational drive
162 Motor housing
164 Stator
166 Conductors
168 Rotor
170 Current supply for erosion system
172 Connecting housing
174 Connecting element
175 Connecting element
176 Adjusting screw
177 Pressure spring
178 Sliding contact

What is claimed is:

1. A drive device for erosion tools, comprising: a drive shaft, an electrode holder connected to the drive shaft, an axial drive which acts on the drive shaft, a rotational drive which acts on the drive shaft with magnetic contact, and a radial bearing; wherein the radial bearing is in the form of a ball track.

2. The drive device according to claim 1; wherein the ball track has a ball bearing race having a plurality of circular rows of balls which are separated a distance apart on the periphery.

3. The drive device according to claim 2; wherein the bails of the ball track are disposed directly on an outer periphery of the drive shaft.

4. The drive device according to claim 2, wherein the bearing race is comprised of plastic material.

5. The drive device according to claim 2; wherein the ball track has a bushing, wherewith the balls rest against an interior periphery of the bushing.

6. The drive device according to claim 1; wherein the direct drive comprises a synchronous motor, wherewith the drive shaft is constantly supplied with magnetization via permanent magnets.

7. The drive device according to claim 6; wherein the direct drive is a torque motor.

8. The drive device according to claim 1; wherein the axial drive has a ring shape, and surrounds the drive shaft.

9. The drive device according to claim 8; wherein the axial drive surrounds the ball track at least on one axial segment.

10. The drive device according to claim 1; wherein the axial drive is a piezo drive.

11. The drive device according to claim 10; wherein the piezo drive has a ring-shaped piezo actor.

12. The drive device according to claim 10; wherein the piezo drive has three stacked actors disposed symmetrically around the drive shaft.

13. The drive device according to claim 12; wherein the three stacked actors are interconnected in a zero-play and frictionless manner via solid linking bodies.

14. The drive device according to claim 1; wherein a spring-loaded disc which is disposed between the axial drive and a housing segment, under stress, and which axially prestresses the axial drive.

15. The drive device according to claim 1; wherein the drive shaft is in the form of a hollow shaft.

16. The drive device according to claim 3; wherein the bearing race is comprised of plastic material.

17. The drive device according to claim 16; wherein the ball track has a bushing, wherewith the balls rest against an interior periphery of the bushing.

18. The drive device according to claim 17; wherein the direct drive comprises a synchronous motor, wherewith the drive shaft is constantly supplied with magnetization via permanent magnets.

19. The drive device according to claim 1; wherein the axial drive has a ring shape, and surrounds the drive shaft.

20. The drive device according to claim 19; wherein the axial drive is a piezo drive.

* * * * *